(12) United States Patent
Lau

(10) Patent No.: US 10,038,470 B2
(45) Date of Patent: Jul. 31, 2018

(54) INTELLIGENT SOCKET AND INTELLIGENT SYSTEM

(71) Applicant: Minwa Auto-Protection (Smart Plug) Technology Co. Limited, HongKong (HK)

(72) Inventor: Hak Wah Lau, HongKong (HK)

(73) Assignee: Minwa Auto-Protection (Smart Plug) Technology Co. Limited, HongKong (HK)

( * ) Notice: Subject to any disclaimer, the term of this patent is extended or adjusted under 35 U.S.C. 154(b) by 0 days.

(21) Appl. No.: 15/811,319

(22) Filed: Nov. 13, 2017

(65) Prior Publication Data

US 2018/0069591 A1 Mar. 8, 2018

Related U.S. Application Data

(63) Continuation of application No. PCT/CN2017/078042, filed on Mar. 24, 2017.

(30) Foreign Application Priority Data

Apr. 8, 2016 (HK) .................................... 16104056

(51) Int. Cl.
*H04B 1/38* (2015.01)
*H04B 1/52* (2015.01)
(Continued)

(52) U.S. Cl.
CPC ............ *H04B 1/52* (2013.01); *H04B 1/0057* (2013.01); *H04B 1/44* (2013.01); *H04B 1/401* (2013.01)

(58) Field of Classification Search
CPC . H04L 67/2823; H04L 65/4069; H04L 67/10; H04L 29/06027; H04L 65/4076;
(Continued)

(56) References Cited

U.S. PATENT DOCUMENTS 5,802,177 A * 9/1998 Daniel ................. H04W 84/14
370/337
2011/0009049 A1 1/2011 Kim et al.

FOREIGN PATENT DOCUMENTS

CN 101527575 A 9/2009
CN 202334780 U 7/2012

OTHER PUBLICATIONS

International Search Report of PCT/CN2017/078042, dated Jun. 29, 2017.

\* cited by examiner

*Primary Examiner* — Rahel Guarino
(74) *Attorney, Agent, or Firm* — Wayne & King LLC

(57) ABSTRACT

The invention relates to network communication safety, and provides an intelligent socket and an intelligent system. The intelligent socket includes a first control module, and a second control module connected with the first control module. The first control module is configured to receive a data signal, transcode the received data signal, and transmit the transcoded data signal. The second control module is configured to receive a data signal, modulate the data signal, and transmit the modulated data signal. The intelligent socket is configured to achieve communication between a control terminal and a controlled terminal and achieve data transmission, demodulation, transcoding and other functions, thereby reducing the burden on the control terminal, improving the intelligence level of the intelligent socket to a certain extent, and bringing more convenience to users.

18 Claims, 7 Drawing Sheets

(51) Int. Cl.
*H04B 1/44* (2006.01)
*H04B 1/00* (2006.01)
*H04B 1/401* (2015.01)

(58) Field of Classification Search
CPC ....... H04L 65/608; H04L 41/22; H04L 51/04; H04L 5/143; H04L 69/08; H04L 2012/2849; H04L 2012/285; H04L 65/103; H04L 69/14; H04N 21/2353; H04N 21/6379; H04N 19/40; H04N 21/2662; H04N 21/6125; H04N 19/44; H04N 21/2181; H04N 21/23418; H04N 21/2347; H04N 21/43615; H04N 21/4622; H04N 21/8193; H04N 21/2143; H04N 21/2365; H04N 21/2383; H04N 21/43632; H04N 21/43637; H04N 21/4382; H04N 21/440218; H04N 7/106; H04N 21/222; H04N 21/43622; H04N 21/4363; H04N 21/4402; H04N 21/4516; H04N 21/2743; H04N 21/234309
See application file for complete search history.

INTELLIGENT SOCKET AND INTELLIGENT SYSTEM

CROSS-REFERENCE TO RELATED APPLICATIONS

This application is a continuation of International Patent Application No. PCT/CN2017/078042 with a filing date of Mar. 24, 2017, and further claims priority to Hong Kong Patent Application No. 16104056.5 with a filing date of Apr. 8, 2016. The content of the aforementioned applications, including any intervening amendments thereto, are incorporated herein by reference.

TECHNICAL FIELD

The subject matter herein generally relates to network communication safety, and particularly relates to an intelligent socket and an intelligent system.

BACKGROUND OF THE PRESENT INVENTION

In the 1980s of the origin of the smart home, along with a large number of household electrical appliances with the electronic technology, the household electrical appliances, the communication equipment and the security disaster prevention equipment and the like are integrated into a whole, and therefore a house automation concept is formed. In the late 80s, due to the development of communication and information technologies, various communication and household appliances in a house are provided, the security equipment is used for monitoring, controlling and managing a commercial system through a bus technology, and is also a prototype of a modern intelligent home.

With the technical progress, more and more electronic products (such as refrigerators, televisions, air conditioners and the like) appear in families. In order to facilitate control, in the prior art, for example, a mobile phone and an universal remote controller and the like to control a plurality of electronic products. A plurality of electronic products are controlled by using an universal remote controller, and a lot of convenience is brought to the life of people. However, the cost of the universal remote controller is relatively high, and when more electronic products appear, the cost of the universal remote controller is higher, and when the mobile phone is used for controlling a plurality of electronic products, the additional function modules such as decoding and the like are required to be arranged in the mobile phone, and the burden of the mobile phone is increased, so that the service life of the mobile phone is prolonged. Therefore, a solution is urgently needed.

SUMMARY OF PRESENT INVENTION

The invention provides an intelligent socket and an intelligent system, and aims to solve the problem that the burden of a control terminal is heavy when a household product is controlled in a centralized manner in the prior art.

The embodiment of the invention is realized in this way, an intelligent socket comprises:

a first control module configured to receive a data signal, transcode the received data signal, and send out the transcoded data signal;

a second control module connected with the first control module, configured to receive a data signal, modulate the data signal, and send the modulated data signal;

wherein the first control module receives the data signal from a control terminal, transcodes the received data signals and transmits the transcoded signal to the second control module, the second control module modulates the transcoded signal to obtain a modulation signal and send the modulation signal to a controlled terminal corresponding to the data signal; or wherein the second control module receives a data signal from the controlled terminal and modulates the received data signal to obtain a modulation signal, and transmits the modulation signal to the first control module, the first control module transcodes the received modulation signal to obtain a transcoded signal and send the transcoded signal to the control terminal.

Preferably, the first control module is configured to receive the data signal from the control terminal, demodulate the received data signal to convert into coded signal, and transmit the coded signal to the second control module; the second control module specifically comprises:

a first demodulation unit configured to receive the coded signal and modulate the coded signal;

a second demodulation unit connected with the first demodulation unit, configured to send the modulation signal to a corresponding controlled terminal to control the controlled terminal to be adjusted to be in a state corresponding to the coded signal.

Preferably, the second control module further comprises:

a receiving unit configured to receive a data signal sent by the controlled terminal; and a second demodulation unit connected with the receiving unit and the first control module respectively, configured to demodulate the data signal and send the demodulated signal to the first control module;

wherein the first control module is further configured to transcode the demodulated signal to obtain a decoded signal and send the decoded signal to the control terminal.

Preferably, the first demodulation unit comprises a first modulation chip U1 and a crystal oscillator connected with the first modulation chip U1;

wherein the transmission unit comprises a transmitting antenna and a first filter subunit, the first modulation chip U1 is connected with an emission antenna through the first filter subunit, and the first filter subunit is configured to filter the received modulation signal and send the signal to a corresponding controlled terminal through the transmitting antenna.

Preferably, the second demodulation unit comprises a second modulation chip U3 and a crystal oscillator connected with the second modulation chip U3;

the receiving unit comprises a receiving antenna and a second filter subunit, the second modulation chip U3 is connected with the receiving antenna through the second filter subunit; the receiving antenna receives a sensing signal of the controlled terminal, and the second filter subunit filters the sensing signal and transmits the signal to the second modulation chip U3 for demodulation.

Preferably, the first filter subunit comprises an inductor L1, a capacitor C8, an inductor L2, a capacitor C9 and an inductor L3, a node formed between the inductor L1 and the capacitor C8 is connected with the PAOUT port of the first modulation chip U1, one end of the inductor L2 is connected with the capacitor C8, and a node formed between the other end of the inductor L2 and the capacitor C9 is connected with the transmitting antenna.

Preferably, the second filter subunit comprises an inductor L4, a capacitor C10, a capacitor C11, and an inductor L5, one end of the inductor L4 is grounded, the other end of the inductor L4 is connected with the receiving antenna; one end of the capacitor C10 is grounded, the other end of the capacitor C10 is divided into two paths, one path is connected with the receiving antenna, and the other path is connected with one end of the capacitor C11, the other end of the capacitor C11 is grounded through the inductor L5, and a node formed between the inductor L5 and the capacitor C11 is connected with the second modulation chip U3.

Preferably, the intelligent socket further comprises:

a voltage conversion module connected with the mains supply power grid, configured to convert an input alternating current into direct current;

a voltage stabilization module connected with the voltage conversion module, configured to carry out voltage stabilization processing on the direct current to provide direct current for the first control module and the second control module.

Preferably, the first control module receives a data signal of the control terminal and the data signal comprises a switch command, the intelligent socket further comprises:

a switch module connected with at least one controlled terminals, configured to stop supplying power to a controlled terminal corresponding to the switch command, or configured to supply power to a controlled terminal corresponding to the switch command.

Another object of the embodiment of the invention is to provide an intelligent system, the system includes a control terminal, at least one controlled terminals, and an intelligent socket, the control terminal is configured to interact with the at least one controlled terminals through the intelligent socket, the intelligent socket comprises a first control module, and a second control module connected with the first control module, wherein the first control module is configured to receive a data signal, transcode the received data signal, and send out the transcoded data signal;

the second control module is configured to receive a data signal, modulate the data signal, and send the modulated data signal;

wherein the first control module receives the data signal from a control terminal, transcodes the received data signals and transmits the transcoded signal to the second control module, the second control module modulates the transcoded signal to obtain a modulation signal and send the modulation signal to a controlled terminal corresponding to the data signal; or wherein the second control module receives a data signal from the controlled terminal and modulates the received data signal to obtain a modulation signal, and transmits the modulation signal to the first control module, the first control module transcodes the received modulation signal to obtain a transcoded signal and send the transcoded signal to the control terminal.

In the embodiment of the invention, the intelligent socket realizes the functions of data transmission, demodulation, transcoding and the like, which reduces the burden of the control terminal, the intelligentization of the socket is improved to a certain extent, and brings convenience to the user.

DETAILED DESCRIPTION OF PREFERRED EMBODIMENTS

In order to enable the aim, the technical scheme and the advantages of the invention to be clearer, the present invention is further described in detail with reference to the accompanying drawings and the embodiments. It should be understood that the specific embodiments described herein are only used to explain the present invention and are not intended to limit the present invention.

In the embodiment of the invention, the intelligent socket includes a first control module, a second control module connected with the first control module. The first control module is configured to receive a data signal, transcode the received data signal, and send the transcoded data signal. The second control module is configured to receive a data signal, modulate the received data signal, and send the modulated data signal. The first control module receives a data signal from a control terminal, transcodes the received data signal, and transmits the transcode signal to the second control module. The second control module is modulated the transcoded signal to obtain a modulation signal, and sent the modulation signal to a controlled terminal corresponding to the data signal. Alternatively, the second control module receives a data signal from the controlled terminal and modulates the received data signal to obtain a modulation signal, and the modulation signal is transmitted to the first control module, the first control module transcodes the received modulation signal to obtain a transcoding signal and sends the transcoding signal to the control terminal.

The control terminal interacts with the controlled terminal through the intelligent socket, the intelligent socket modulates a data signal sent by the control terminal so as to be matched with the controlled terminal, then the data signal is sent to the controlled terminal, and the functions of data transmission, demodulation, transcoding and the like are achieved through the intelligent socket. The burden of the control terminal is reduced, the intelligentization of the socket is improved to a certain extent, and brings convenience to users.

In order to illustrate the technical solution of the present invention, the following is described by specific examples.

First Embodiment

Figure 1:
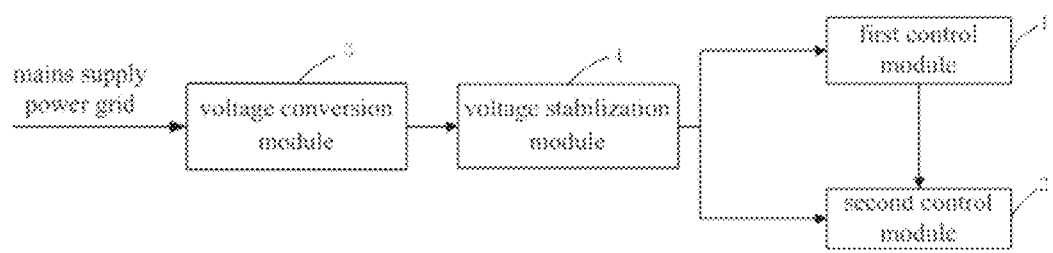
FIG. 1 is a structural diagram of an intelligent socket provided by a first embodiment of the present invention.

FIG. 1 shows a structure diagram of an intelligent socket according to a first embodiment of the present invention, which is described in detail below: the intelligent socket includes a first control module 1, and a second control module 2 connected with the first control module 1.

The first control module 1 is configured to receive a data signal, transcode the received data signal, and send the transcoded data signal. In detail, the first control module 1 can receive a data signal with preset frequency (such as 2.4 GHz), and can also be other frequencies and is not limited herein.

The second control module 2 is configured to receive a data signal, transcode the received data signal, and send the transcoded data signal.

The first control module 1 receives a data signal from the control terminal and transcodes the received data signal, and transmits the transcoded signal to the second control module 2. The second control module 2 modulates the transcoded signal to obtain a modulation signal, and sends the modulation signal to a second party. Or The second control module 2 receives a data signal from the controlled terminal modulates the received data signal to obtain a modulation signal, and the modulation signal is transmitted to the first control module 1. The first control module transcodes the received modulation signal to obtain a transcoding signal, and sends the transcoding signal to a first party.

Specifically, the control terminal interacts with the controlled terminal through the intelligent socket, and the data signal can be a control command sent by the user on the basis of the control terminal and configured to control the controlled terminal, and can also be a current state information sent by the controlled terminal, wherein the control terminal can be any terminals with a control function, such as a mobile phone, a remote controller, a PAD and the like, in this embodiment, the control terminal is preferably a mobile phone. The technical scheme of the invention is described by a mobile phone as an example. The controlled terminal can be any household article with an infinite transmission function, such as a combination including any one or more of the following: a television, a computer, a washing machine, an air conditioner, an LED lamp, a doorbell and the like and can also be other household articles, which is not limited herein.

In one preferable scheme of the embodiment, for example, the control terminal is a mobile phone, and the controlled terminal is an air conditioner. Firstly, a control command is sent by an user through an APP of the mobile phone, such as controlling the air conditioner to start or control heating or refrigerating of the air conditioner, after sending the command through the APP of the mobile phone, the mobile phone transmits the command through a wireless network, and a high-frequency data signal (2.4 GHz) carrying the command is sent through a router or other gateway equipment. When the first control module 1 of the intelligent socket receives the high-frequency data signal, and the high-frequency data signal is demodulated to obtain an encoding signal, the second control module 2 modulates the encoding signal into a modulation signal (the transmission frequency can be a high-frequency data signal of 433 433 MHz), and then a corresponding controlled terminal is found based on the identification code corresponding to the controlled terminal, and then is sent to a corresponding controlled terminal (such as an air conditioner) after receiving the coding signal, the controlled terminal adjusts the current state based on the encoding signal. For example, the control command is a heating mode of the air conditioner, and the temperature is 29°, the air conditioner is converted into a heating mode after receiving the instruction, and the temperature is adjusted to be 29°.

In another preferable scheme of the embodiment, firstly, the controlled terminal collects the state information of itself, wherein the state information includes the current state data of the controlled terminal, and other relevant information such as the current environment temperature, the humidity and other information can be further included. With conditioner as an example, the state information of the air conditioner can include the mode (such as refrigeration) of the current air conditioner), the current indoor temperature, the current time, the model of the air conditioner and the like, it can also include the time needed to reach the preset temperature, and the method is not limited herein. When the controlled terminal sends the state information (sending the high-frequency data signal with the frequency of 433 MHZ) to the second control module 2, the second control module 2 modulates the high-frequency data signal, and then the modulated data signal is transcoded by the first control module 1 to obtain a transcoding signal, the transcoding signal is sent to a control terminal (mobile phone), and the mobile phone modulates the received modulation signal, so as to obtain a corresponding state information, and the state information is stored in the corresponding APP based on the identification code of the controlled terminal for the user to check.

Further preferably, an APP corresponding to the controlled terminal is arranged in the mobile phone, that is, each controlled terminal corresponds to one APP on the control interface of the control terminal, so that the user can open the corresponding APP when the user needs to control a certain controlled terminal, or only one APP can be used, but each controlled terminal is provided with a code, the user only needs to select the corresponding codes and the corresponding setting information, and in order to reduce the burden of the mobile phone, the information stored by the APP is periodically deleted of the present invention. For example, the stored information is arranged according to the time sequence, when the capacity of the storage information exceeds a preset value or the number of the storage information exceeds a threshold value, the information which is firstly stored is deleted so as to reduce the burden of the mobile phone.

In another preferred embodiment of the embodiment, when the user needs to set the controlled terminal, the state of the controlled terminal at the moment is not known, the user can send a consultation indication (the sending frequency is 2.4 GHz high-frequency data signal) based on the corresponding APP of the mobile phone). When the first control module 1 receives the indication, the first control module 1 demodulates the high-frequency data signal, and then the data signal is modulated by the second control module 2 to be matched with a controlled terminal (such as 433 MHz) and sent to the controlled terminal through as a high-frequency data signal, the controlled terminal receives the state information of itself after receiving the high-frequency data signal, the state information is fed back to the second control module 2 in the form of a high-frequency data signal with the sending frequency of 433 MHz, the second control module 2 demodulates the received data signal and the demodulated data signal is decoded by the first control module 1 to convert into a data signal matched with the mobile phone and feeds back the data signal to the mobile phone, the mobile phone decodes the received high-frequency data signal and converts the high-frequency data signals into data signals and then stores the data signals in the APP. The user can click the corresponding APP to check, and the user can set the state control command of the controlled terminal according to the viewing information at the moment, the control command is transmitted through the intelligent socket, the controlled terminal adjusts the current state information according to the control command.

In the embodiment, when the controlled terminal needs to be controlled, a control command is set through the mobile phone APP, and the control command is demodulated through the intelligent socket, and the high-frequency data signal is converted into a high-frequency data signal which is matched with the receiving frequency of the controlled terminal, the user does not need to demodulate the information through the mobile phone or the controlled terminal itself, and the burden of the control terminal or the controlled terminal can be reduced. The controlled terminal is controlled by the intelligent socket, so that the function of the socket can be enhanced, and the intelligent socket is intelligent. In addition, due to the fact that each controlled terminal is provided with an identification code, which prevents mutual interference of wireless signals, the control accuracy is high, and the reliability is good.

In one preferable scheme of the embodiment, the intelligent socket can further includes:

A voltage conversion module 3 is connected with a mains supply power grid and configured to convert the input alternating current into direct current, so that direct currents can be supplied to all the modules inside the intelligent socket. The voltage conversion module 3 is connected with the first control module 1 and the second control module 2 of the intelligent socket, and supplies power for the modules.

The intelligent socket further includes a voltage stabilization module 4 connected with the voltage conversion module 3, which is configured to voltage stabilization of the direct current, so as to provide stable direct current for each module inside the intelligent socket, such as the first control module 1, the second control module 2 and the like.

In one preferable scheme of the embodiment, the data signal sent by the control terminal can further includes a switch command. The intelligent socket is electrically connected with at least one controlled terminals, namely at least one power plugs of the controlled terminal is connected with the intelligent socket. The intelligent socket further includes:

A switch module is connected with at least one controlled terminal, and is configured to stop supplying power to the controlled terminal corresponding to the switch command according to the switch command, or supply power to the controlled terminal corresponding to the command according to the switch instruction. Specifically, the power input end of the switch module is connected with the mains supply power grid, and the power output end of the switch module is connected with at least one controlled terminals, and the first control module is used for controlling the power supply of the controlled terminal according to the command of the user. When the first control module receives the switch command, the command is decoded and analyzed, the analysis result is fed back to the switch module, and the switch module executes corresponding operation according to the switch command. Further, the switch instruction further includes a control time, for example, the current time is 12:00, and the switch command is 16:00 to turn off the air conditioner, and the switch module executes the function of turning off the air conditioner at 16:00 according to the switch command.

In a further preferable scheme of the embodiment, the intelligent socket can further include:

A display module is respectively connected with the first control module 1 and the second control module 2, which is configured to display current state information of the intelligent socket. The current state information of the intelligent socket includes a current time, a current voltage value, a switch state of each path of the intelligent socket and the like, and other information can also be included and is not limited herein.

In a further preferable scheme of the embodiment, the intelligent socket can further include:

A protection module is connected with the switch module, which is configured to monitor the current state of the intelligent socket in real time. If occurs abnormal, an alarm for turning off the intelligent socket is sent to the switch module to protect the intelligent socket.

It should be noted that the switch module, the protection module and the display module are connected with the voltage conversion module 3 through the voltage stabilization module 4, and the voltage conversion module 3 provides direct current power source for said modules.

Figure 2:
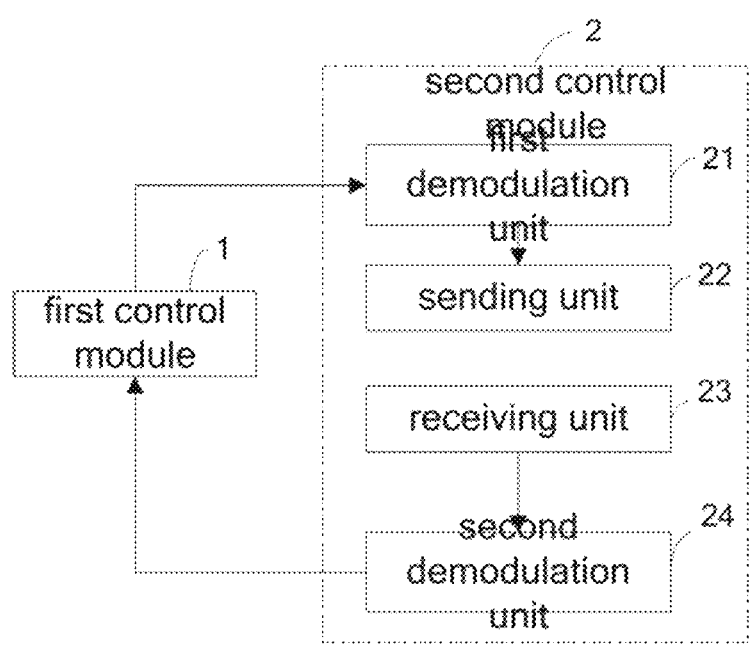
FIG. 2 is a specific structural diagram of a second control module 2 provided by the first embodiment of the present invention.
Figure 3:
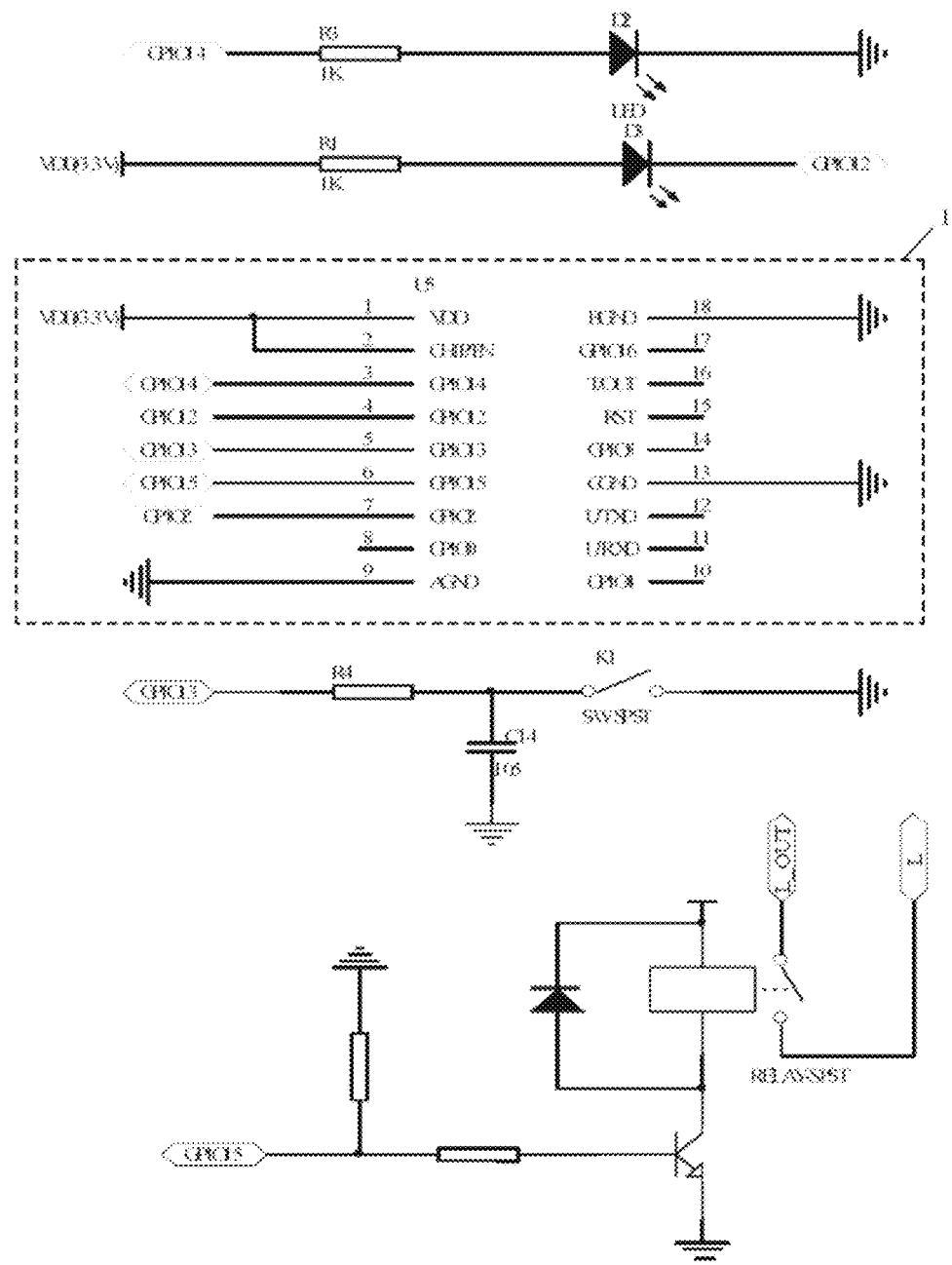
FIG. 3 is a part of a circuit diagram provided by the first embodiment of the present invention.

In one preferable scheme of the embodiment, the first control module 1 receives a data signal from the control terminal, the received data signal is demodulated and transcoded to be converted into coded signal, and the first control module 1 transmits the coded signals to the second control module 2. FIG. 2 illustrates a specific structural diagram of the second control module 2 of the intelligent socket. The second control module 2 specifically includes a first demodulation unit 21 and a sending unit 22 connected with the first demodulation unit 21. The first demodulation unit 21 receives the coded signal sent by the first control module 1 and modulates the coded signal to obtain a modulation signal, and the modulation signal is sent to the controlled terminal corresponding to the modulation signal by the sending unit, so as to control the controlled terminal to adjust to a state corresponding to the data signal.

Preferably, the first control module 1 can be a WIFI module, the first demodulation unit 21 can be a first 433M demodulation unit.

Specifically, the first control module 1 decodes the received data signal (which is a 2.4 GHz high-frequency data signal) to obtain decoded data, and analyses and converts the decoded data into an encoded signal according to a built-in preset conversion protocol. The conversion protocol is preset as a well-known technology and is not further described herein. The encoded signal carries the identification code of the controlled terminal and the corresponding command, and the identification code can be set according to the actual situation, such as letters or numbers or other codes, and is not limited herein. The first demodulation unit modulates the encoded signal to obtain a high-frequency data signal with the frequency of 433 MHz, and the high-frequency data signal is matched with the corresponding controlled terminal. The high-frequency data signal is sent to the corresponding controlled terminals through the sending unit 22.

In a further preferable scheme of the embodiment, the second control module 2 can further includes a receiving unit 23, and a second demodulating unit 24 connected with the receiving unit 23. The second demodulation unit 24 is further connected with the first control module 1. Preferably, the second demodulation unit 24 can be a second 433M demodulation unit, wherein the receiving unit 23 receives sensing signal (which can also be other signals, which are not limited in this time) from a controlled terminal (such as an air conditioner) and transmits the sensing signal to the second demodulation unit 24, and the second demodulation unit 24 demodulates the received sensing signal, and transmits the demodulated signals to the first control module 1. The first control module transcodes on the demodulated signal to obtain a decoded signal, and sends the decoded signal to the control terminal. Specifically, the decoded signal carries the identification code of the controlled terminal.

FIG. 3-6 respectively illustrates parts circuit structure diagram of the intelligent socket (the embodiment only provides a specific circuit principle diagram of a part of modules, the rest of the circuit principle diagram of the modules is not given).

The WIFI module 1 (see FIG. 3) includes a conversion chip U5, a VDD power supply input port (3.3v), an enable port CHIP/EN connected with the power input port, a BGND grounding port, a GPIO 12 port, a GPIO 13 port, a GPIO 14 port, a GPIO 15 port, a T/OUT port, a GPIO 2 port, a GPIO 0 port, a GPIO 5 port, a U/TXD port, a U/RXD port, a GPIO 4 port, an AGND grounding port, a CGND grounding port and the like. The GPIO 2 port of the conversion chip U5 is connected with the first 433M demodulation unit 21, the GPIO 4 port is connected with the second demodulation unit 24, and the GPIO 0 port is connected with the second demodulation unit 24.

The first 433M demodulation unit 21 (see FIG. 3) includes a first demodulation chip U1 (the model can be Hs2303-PT), and a crystal oscillator. The first demodulation chip U1 includes a PVSS port, a VCC port, a XILOUT port, a GND grounding port, a VDD power supply input port, a VPP port, a PA 0 port, a PA 1, a PA 2, a PA 3, a PA 4 port, a PB 0 input port, and a PAOUT output port. The VCC port is connected with the power input end, the PVSS port is grounded, and the PVSS port is also connected with the VCC port through a capacitor C2. Two ends of the crystal oscillator are respectively connected with the XILOUT port and the XILIN port. The PB 3 port is connected with the LED lamp D1 through a current-limiting resistor R1 (1K), and the other ends of the LED lamp D1 is divided into two paths, one path is connected with the power input end through the capacitor C1, and the other path is grounded.

Specifically, the PB 0 port of the first demodulation chip U1 is connected with the GPIO 2 port of the conversion chip U5. The conversion chip U5 transmits the transcoded signal to the first demodulation chip U1 through the GPIO 2 port, and the PAOUT output port of the first demodulation chip U1 is connected with the sending unit 22, and transmits the demodulation signal to the sending unit 22 through the PAOUT output port.

Figure 4:
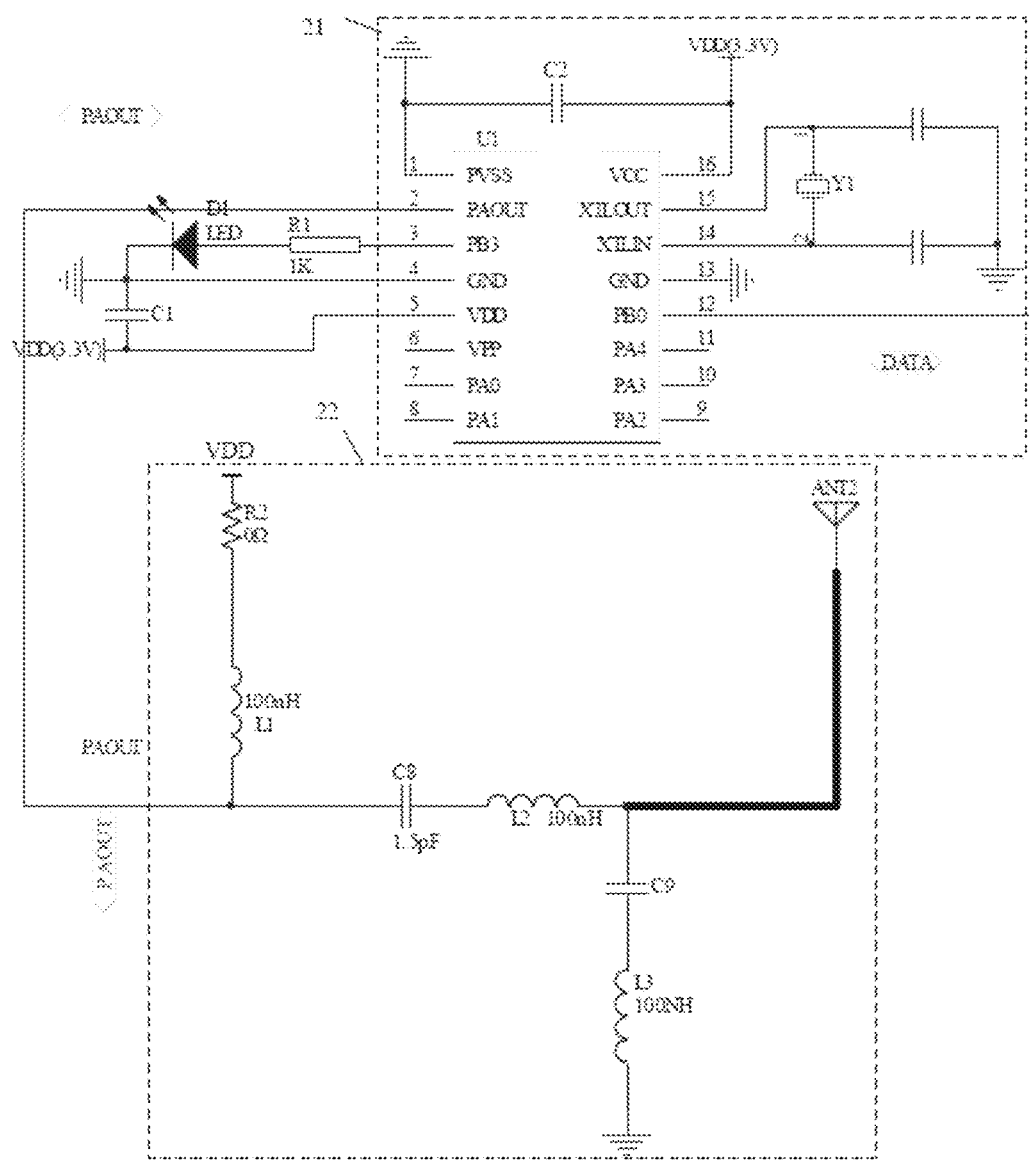
FIG. 4 is another part of the circuit diagram provided by the first embodiment of the present invention.
Figure 5:
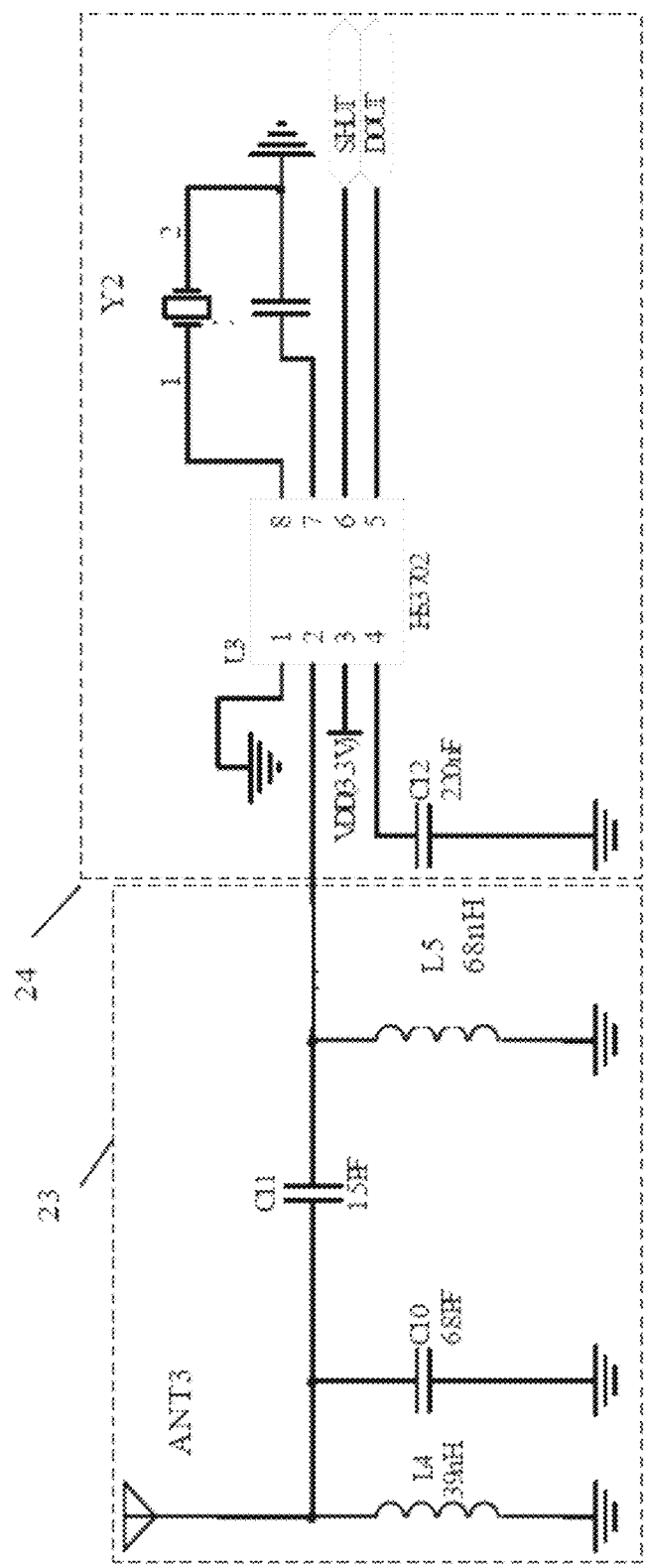
FIG. 5 is another part of the circuit diagram provided by the first embodiment of the present invention.
Figure 6:
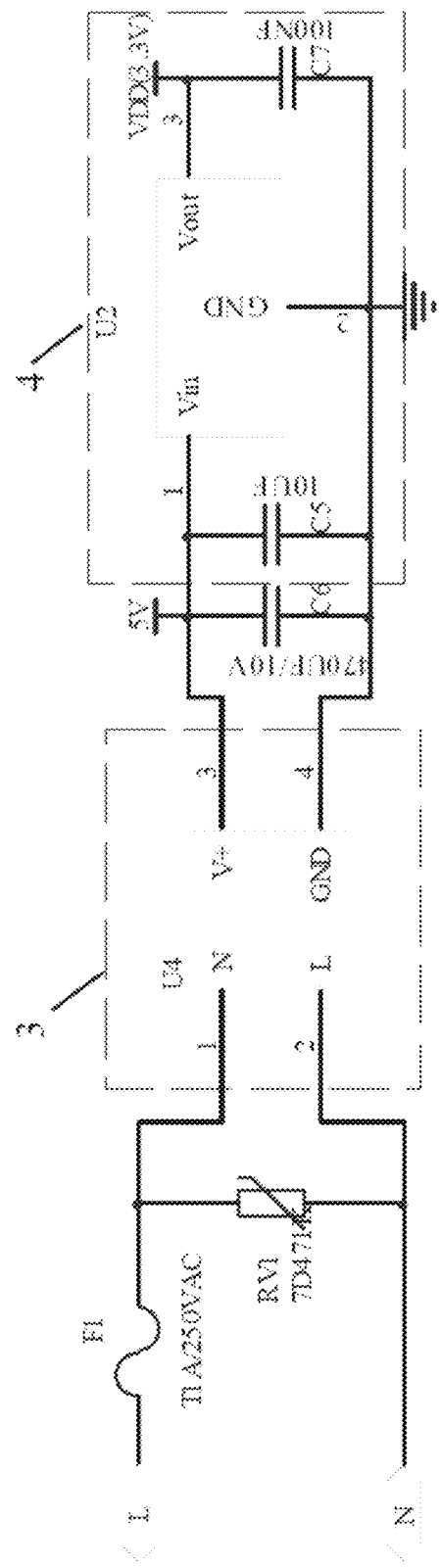
FIG. 6 is another part of the circuit diagram provided by the first embodiment of the present invention.

The sending unit 22 specifically includes a transmitting antenna ANT 2 and a first filter subunit (see FIG. 4). The first filter subunit includes an inductor L1 (100 nH), an inductor L2 (100 nH) and an inductor L3 (100 nH), a capacitor C8 (1.5 pF) and a capacitor C9 (5p), wherein one end of the first filter subunit is connected to the power input end through a current limiting resistor R2, one end of the inductor L1 is connected to the current limiting resistor R2 (0Ω), and the other end of the inductor L1 is connected with the capacitor C8 to form a node to be connected with the PAOUT output port of the first demodulation chip U1, and the other end of the capacitor C8 is connected with the inductor L2, a node is formed at the other end of the inductor L2 and one end of the capacitor C9, and the node is connected with the transmitting antenna ANT 2, and the other end of the capacitor C9 is grounded through the inductor L3. The first demodulation chip U1 filters the demodulation signal through the first filter subunit, and the signal is sent to the corresponding controlled terminal through the transmitting antenna ANT 2.

The second 433M demodulation unit 24 (see FIG. 5) specifically includes a second demodulation chip U3 (the model can be HS3702) and a crystal oscillator connected with the second demodulation chip U3. The second demodulation chip U3 includes a VSS port, a REFOS port, a CAGC port, a SHUT port, a DOUT port, a CTH port, a VDD power supply input port, and an ANT port. The two ends of the crystal oscillator are respectively connected the REFOSC port and the CAGC port. The VSS port is grounded. The ANT port is connected with the receiving unit 23. The CTH port is grounded through a capacitor C12 (220 nF). The DOUT port is connected with a GPIO 4 port of the conversion chip U5. The SHUT port is connected to a GIOP 2 port of the conversion chip U5. A demodulation signal is sent to the WIFI module 1 through the DOUT port.

The receiving unit 23 specifically includes a receiving antenna ANT3 and a second filter subunit. The second filter subunit specifically includes an inductor L4 (39 nH), a L5 (68 NZ), a capacitor C11 (1.5 pF), and C10 (6.8 pF). One end of the capacitor L4 is grounded, the other end of the capacitor L4 and one end of capacitor C11 form a node, and the node is connected with the receiving antenna ANT3. The other end of the capacitor C11 is connected with one end of the inductor L15 to form a node, the node is connected with an ANT port of the second demodulation chip U3, and the other end of the inductor L15 is grounded. When the receiving antenna ANT3 receives the data signal sent by the controlled terminal filters through the second filter subunit, and transmits to the second demodulation chip U3 for demodulation when the interference is removed, so that the reliability of data transmission is improved.

The voltage conversion module 3 specifically includes a voltage conversion chip U4. A zero line end N and a live line end L of the voltage conversion chip U4 are connected with a live line and a null line of a mains power respectively and output 5V direct current to the voltage stabilization module. The voltage stabilization module includes a voltage stabilizer U2 (the model can be AMI 117-3.3), a capacitor C5 (10 UF), and a capacitor C7 (100 NF). A capacitor C6 (470 UF/10V) is arranged between the voltage conversion module 3 and the voltage stabilization module 4. Two ends of the capacitor C5 and the capacitor C6 are connected with two output ends of the voltage conversion chip U4. A VIN input end of the voltage stabilizing chip U2 is connected with the voltage conversion chip to output 3.3V voltage for other modules of the intelligent socket. In order to further stabilize the voltage, an output end of the voltage stabilizing chip U2 is grounded through the capacitor C7.

In one preferred scheme of this embodiment, the intelligent socket further includes a control switch (see FIG. 3) configured to control the WIFI module 1. The control switch is connected with the GPIO 13 port of the conversion chip U5, and includes a resistor R4, a switch K1 and a capacitor C14. One end of the resistor R4 is connected with the GPIO 13 port of the conversion chip U5, and the other end of the resistor R4 is connected with the switch K1 and is also grounded through the capacitor C14, and the other end of the switch K1 is grounded.

Further, the intelligent socket further includes a prompting LED lamp D3 and a prompting LED lamp D4. One end of the prompting LED lamp D3 is grounded, and the other end of the prompting LED lamp D3 is connected with the GPIO 14 port of the conversion chip U5 through a resistor R3 (resistance value is 1K). One end of the prompt LED lamp D4 is connected with the input end of the power supply through a resistor R1 (resistance value is 1K), and the other end of the prompt LED lamp D4 is connected with the GPIO 12 port of the conversion chip U5. When the power supply is introduced, the prompting LED lamp D3 is turned on, and the WIFI module 1 is power on at the moment.

In the embodiment, the principle of the main circuit is summarized as follows: when the transcoding chip U5 of the WIFI module 1 receives the data signal sent by the control terminal, the transcoding chip U5 decodes and converts the data signal into an encoding signal according to the built-in preset conversion protocol, and transmits the signal to the first demodulation chip U1 through the GPIO2 port. The first demodulation chip modulates the received coded signal, and transmits the modulation signal to the sending module through the PAOUT output port. The first filter subunit of the sending module filters the modulating signal, the transmitting antenna sends the filtered signal to the corresponding controlled terminal, and the controlled terminal decodes the received data signal to execute corresponding operation.

When the receiving antenna of the receiving module receives the data signal (such as an induction signal) and the data signal is fed back by the controlled terminal. Firstly, the received data signal is filtered through the second filter subunit so as to eliminate unnecessary interference. Then, the second filter subunit transmits the signal to the second demodulation chip U3, and the second demodulation chip U3 demodulates the received data signal and transmits the data signal to the transcoding chip U5 of the WIFI module through the DOUT output port. The transcoding chip U5 transcodes the received demodulation signal according to the built-in preset conversion protocol to obtain a decoding signal and send the decoding signal to the control terminal.

In the embodiment, the intelligent socket realizes communication between the control terminal and the controlled terminal. The intelligent socket achieves data transmission, demodulating, transcoding and the like, and reduces the burden of the control terminal. The intelligence of the socket is improved to a certain extent, and brings convenience to the user.

In addition, the control terminal controls the intelligent socket to make the controlled terminal power supply or power of, so that the user does not need to power off manually, and the control time can be set, which brings great convenience to the user.

In addition, the controlled terminal can send the current state information of itself to the control terminal according to the condition or the requirement of the user, so that the user does not need to check one by one, which relieves the burden of the user and brings convenience to the user.

It should be understood that in the embodiments of the present invention, the sequence numbers of all the processes are different, and the sequence numbers are not required to be executed, the execution sequence of each process should be determined by the function and the internal logic of the process, does not need to be limited by the implementation process of the embodiment of the invention.

Embodiment 2

Figure 7:
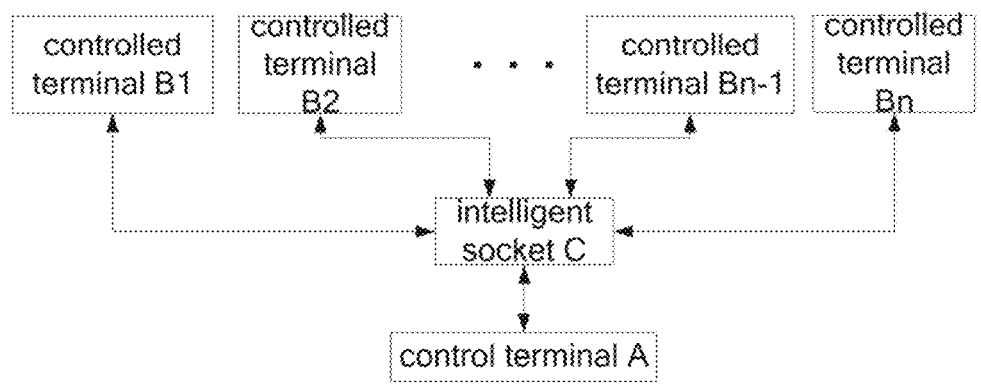
FIG. 7 is a structural diagram of an intelligent system provided by a second embodiment of the present invention.

FIG. 7 shows a structural diagram of an intelligent control system provided by the second embodiment of the present invention. The system specifically includes a control terminal A, at least one controlled terminals B, and an intelligent socket C. The specific structure and the working principle of the intelligent socket C can be described with reference to the above embodiment, and the detailed structure and the working principle of the intelligent socket C are not described in detail herein.

A power supply end of the at least one controlled terminals is connected with a power output end of the intelligent socket, a power input end of the intelligent socket is connected with a mains supply power grid. The control terminal communicates with the controlled terminal through the intelligent socket, interacts with the controlled terminal, and the intelligent socket controls the power supply of the controlled terminal.

In the invention, the intelligent socket realizes communication between the control terminal and the controlled terminal. The intelligent socket achieves data transmission, demodulating, transcoding and the like, and reduces the burden of the control terminal. The intelligence of the socket is improved to a certain extent, and brings convenience to the user.

In addition, the control terminal controls the intelligent socket to make the controlled terminal power supply or power of, so that the user does not need to power off manually, and the control time can be set, which brings great convenience to the user.

In addition, the controlled terminal can send the current state information of itself to the control terminal according to the condition or the requirement of the user, so that the user does not need to check one by one, which relieves the burden of the user and brings convenience to the user.

Ordinary technical personnel in this art can realize that an unit and an algorithm step of the examples described in connection with the embodiments disclosed herein, and can be implemented in an electronic hardware or a combination of computer software and electronic hardware. Whether the functions are executed by hardware or software depends on the specific application and design constraint conditions of the technical scheme. A person skilled in the art can use different methods to implement the described functions for each particular application, but the implementation is not considered to be beyond the scope of the invention.

Persons skilled in the art can clearly understand that the system for the description is convenient and concise for description, the specific working process of the device and the unit can be referred to the corresponding process in the method embodiment, and the description is not repeated herein.

In the several embodiments provided of the present application, it should be understood that the system, the device and the method disclosed by the invention can be realized in other manners. For example, the device embodiments described above are merely illustrative, for example, the division of the units, only one logic function is divided, and a further division mode can be achieved in actual implementation. For example, multiple units or components can be combined or can be integrated into another system, or some features can be ignored or not executed. In addition, the displayed or discussed mutual coupling or direct coupling or communication connection can be through some interfaces, an indirect coupling or communication connection of the device or the unit can be in an electrical, mechanical or other forms.

The units illustrated as separate components may or may not be physically separate, the component displayed as an unit can be or can not be a physical unit, or can be distributed to a plurality of networks an unit part or all of the units can be selected according to actual needs to achieve the purpose of the scheme of the embodiment.

In addition, the functional units in various embodiments of the present invention can be integrated in a processing unit, and two or more units can be integrated in one unit.

The function is implemented in form of a software functional unit and sold or used as an independent product can be stored in a computer readable storage medium based on such understanding. The technical scheme of the invention is essentially the part which makes contributions to the prior art or the part of the technical scheme can be embodied in the form of a software product. The computer software product is stored in a storage medium, and includes a plurality of instructions to make one computer device (which can be a personal computer, a server, or a network equipment or the like) execute all or part of the steps of the method disclosed by the embodiment of the invention. The storage medium includes a USB flash disk, a mobile hard disk, a read-only memory (ROM), a random access memory (RAM), a magnetic disk or an optical disk and other media capable of storing program codes.

The above descriptions are only specific embodiments of the present invention, but the protection scope of the present invention is not limited thereto. Any technical personnel who is familiar with the technical field within the scope of the disclosure of the technology can easily change or replace, the method and the device are all within the protection scope of the invention. Therefore, the protection scope of the invention is subject to the protection scope of the claims.

I claim:

1. An intelligent socket, comprising:
   a first control module configured to receive a data signal, transcode the received data signal, and send out the transcoded data signal;
   a second control module connected with the first control module, configured to receive the data signal, modulate the data signal, and send the modulated data signal;
   wherein the first control module receives the data signal from a control terminal, transcodes the received data signal and transmits the transcoded signal to the second control module, the second control module modulates the transcoded signal to obtain a modulation signal and send the modulation signal to a controlled terminal corresponding to the data signal; or
   wherein the second control module receives the data signal from the controlled terminal and modulates the received data signal to obtain a modulation signal, and transmits the modulation signal to the first control module, the first control module transcodes the received modulation signal to obtain the transcoded signal and send the transcoded signal to the control terminal.

2. The intelligent socket of claim 1, wherein the fast control module is configured to receive the data signal from the control terminal, demodulate the received data signal to convert into coded signal, and transmit the coded signal to the second control module; the second control module specifically comprises:
   a first demodulation unit configured to receive the coded signal and modulate the coded signal;
   a second demodulation unit connected with the first demodulation unit, configured to send the modulation signal to a corresponding controlled terminal to control the controlled terminal to be adjusted to be in a state corresponding to the coded signal.

3. The intelligent socket of claim 2, wherein the second control module further comprises:
   a receiving unit configured to receive a data signal sent by the controlled terminal; and
   the second demodulation unit connected with the receiving unit and the first control module respectively, configured to demodulate the data signal and send the demodulated signal to the first control module;
   wherein the first control module is further configured to transcode the demodulated signal to obtain a decoded signal and send the decoded signal to the control terminal.

4. The intelligent socket of claim 2, wherein the first demodulation unit comprises a first modulation chip U1 and a crystal oscillator connected with the first modulation chip U1;
   wherein a transmission unit comprises a transmitting antenna and a first filter subunit, the first modulation chip U1 is connected with an emission antenna through the first filter subunit, and the first filter subunit is configured to filter the received modulation signal and send the signal to a corresponding controlled terminal through the transmitting antenna.

5. The intelligent socket of claim 3, wherein the second demodulation unit comprises a second modulation chip U3 and a crystal oscillator connected with the second modulation chip U3;
   the receiving unit comprises a receiving antenna and a second filter subunit, the second modulation chip U3 is connected with the receiving antenna through the second filter subunit; the receiving antenna receives a sensing signal of the controlled terminal, and the second filter subunit filters the sensing signal and transmits the signal to the second modulation chip U3 for demodulation.

6. The intelligent socket of claim 4, wherein the first filter subunit comprises an inductor L1, a capacitor C8, an inductor L2, a capacitor C9 and an inductor L3, a node formed between the inductor L1 and the capacitor C8 is connected with the PAOUT port of the first modulation chip U1, one end of the inductor L2 is connected with the capacitor C8, and a node formed between the other end of the inductor L2 and the capacitor C9 is connected with the transmitting antenna.

7. The intelligent socket of claim 5, wherein the second filter subunit comprises an inductor L4, a capacitor C10, a capacitor C11, and an inductor L5, one end of the inductor L4 is grounded, the other end of the inductor L4 is connected with the receiving antenna; one end of the capacitor C10 is grounded, the other end of the capacitor C10 is divided into two paths, one path is connected with the receiving antenna, and the other path is connected with one end of the capacitor C11, the other end of the capacitor C11 is grounded through the inductor L5, and a node formed between the inductor L5 and the capacitor C11 is connected with the second modulation chip U3.

8. The intelligent socket of claim 1, wherein the intelligent socket further comprises:
   a voltage conversion module connected with a mains supply power grid, configured to convert an input alternating current into direct current;
   a voltage stabilization module connected with the voltage conversion module, configured to carry out voltage stabilization processing on the direct current to provide direct current for the first control module and the second control module.

9. The intelligent socket of claim 8 wherein the first control module receives the data signal of the control terminal and the data signal comprises a switch command, the intelligent socket further comprises:
   a switch module connected with at least one controlled terminals, configured to stop supplying power to a controlled terminal corresponding to the switch command, or configured to supply power to a controlled terminal corresponding to the switch command.

10. An intelligent control system, wherein comprises a control terminal, at least one controlled terminals, and an intelligent socket according to claim 1, and the control terminal is configured to interact with the at least one controlled terminals through the intelligent socket.

11. An intelligent control system, wherein comprises a control terminal, at least one controlled terminals, and an intelligent socket according to claim 2, and the control terminal is configured to interact with the at least one controlled terminals through the intelligent socket.

12. An intelligent control system, wherein comprises a control terminal, at least one controlled terminals, and an intelligent socket according to claim 3, and the control terminal is configured to interact with the at least one controlled terminals through the intelligent socket.

13. An intelligent control system, wherein comprises a control terminal, at least one controlled terminals, and an intelligent socket according to claim 4, and the control terminal is configured to interact with the at least one controlled terminals through the intelligent socket.

14. An intelligent control system, wherein comprises a control terminal, at least one controlled terminals, and an intelligent socket according to claim 5, and the control terminal is configured to interact with the at least one controlled terminals through the intelligent socket.

15. An intelligent control system, wherein comprises a control terminal, at least one controlled terminals, and an intelligent socket according to claim 6, and the control terminal is configured to interact with the at least one controlled terminals through the intelligent socket.

16. An intelligent control system, wherein comprises a control terminal, at least one controlled terminals, and an intelligent socket according to claim 7, and the control terminal is configured to interact with the at least one controlled terminals through the intelligent socket.

17. An intelligent control system, wherein comprises a control terminal, at least one controlled terminals, and an intelligent socket according to claim 8, and the control terminal is configured to interact with the at least one controlled terminals through the intelligent socket.

18. An intelligent control system, wherein comprises a control terminal, at least one controlled terminals, and an intelligent socket according to claim 9, and the control terminal is configured to interact with the at least one controlled terminals through the intelligent socket.

* * * * *